Figure 7:
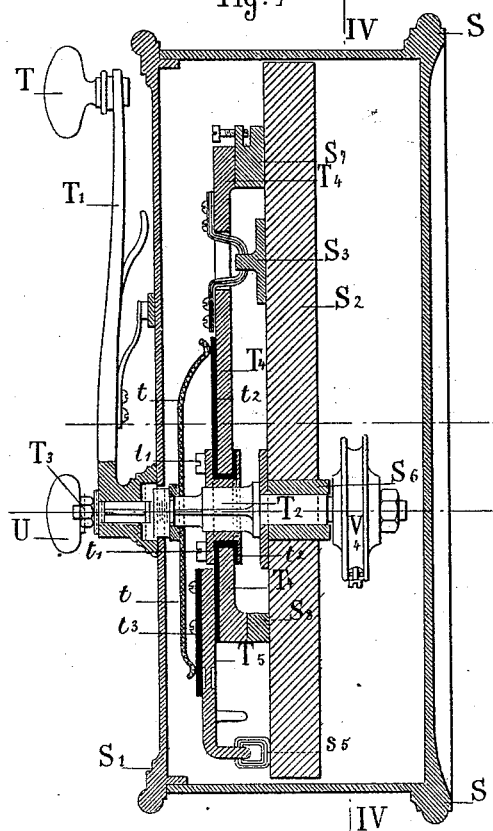

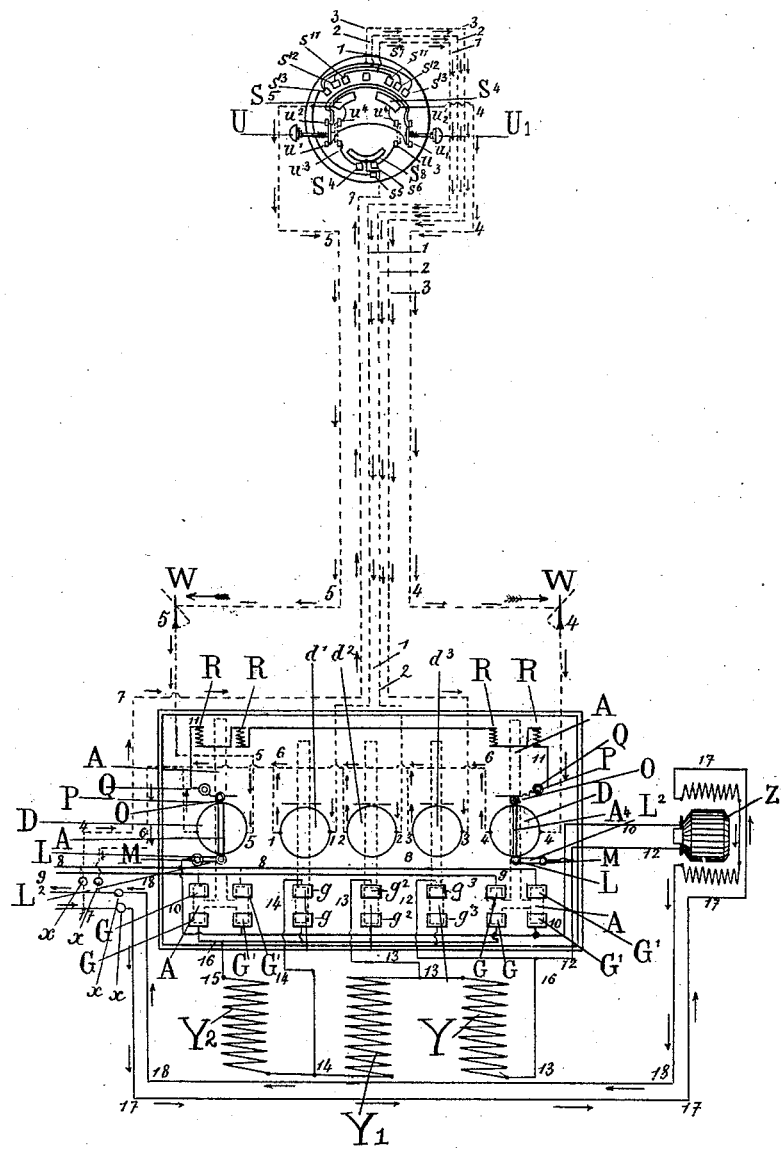

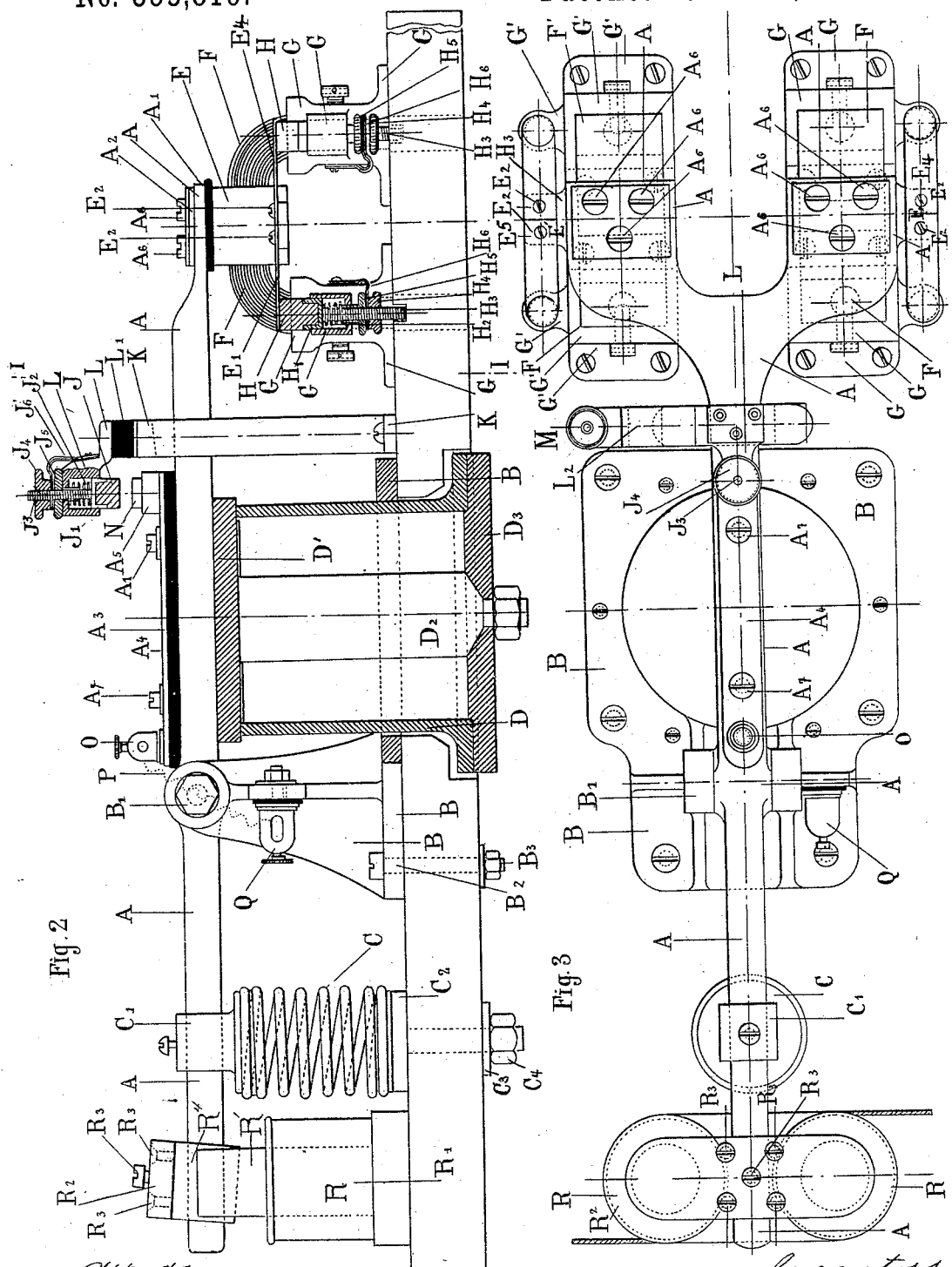

(No Model.) Sheets—Sheet 3.
G. SAUTTER, J. M. L. SAVATIER & C. E. DE LAGABBE.
CONTROL SYSTEM FOR ELECTRIC MOTORS.
No. 553,819. Patented Jan. 28, 1896.
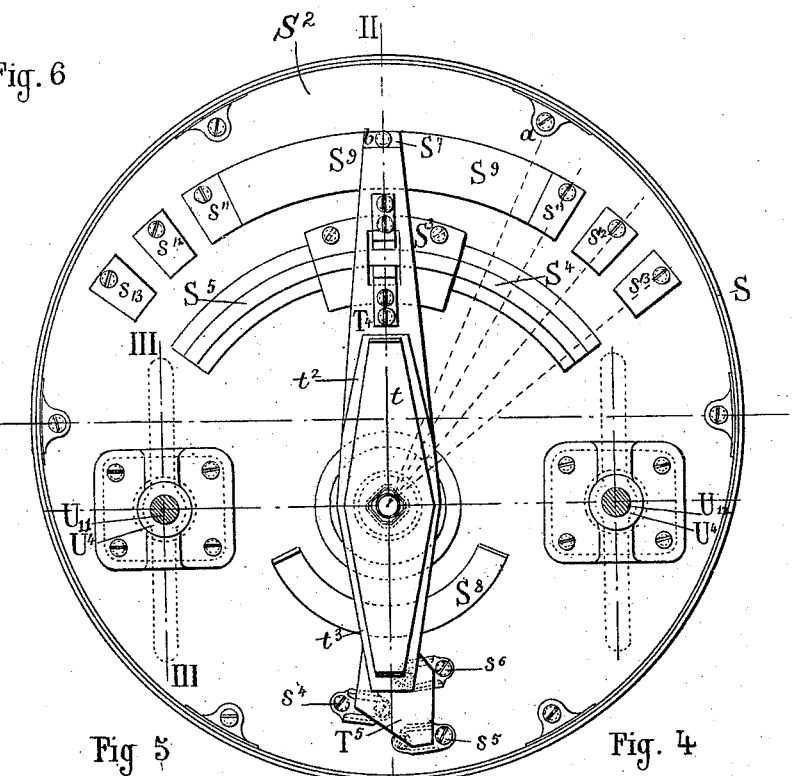
Fig. 6
Fig. 5    Fig. 4
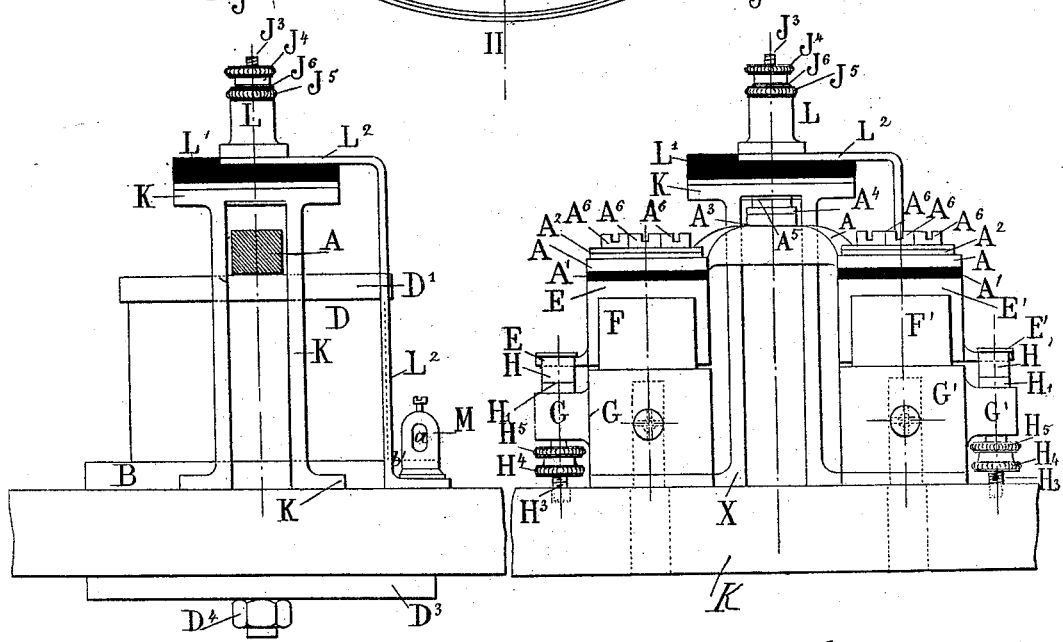
Attest
Samuel H. Fisher
E. L. Est.
Inventors
Gaston Sautter, J. M. L. Savatier
and C. E. de Lagabbe
by Pollok & Mauro,
their attorneys.

(No Model.) 5 Sheets—Sheet 4.

G. SAUTTER, J. M. L. SAVATIER & C. E. DE LAGABBE.
CONTROL SYSTEM FOR ELECTRIC MOTORS.

No. 553,819. Patented Jan. 28, 1896.

(No Model.) 5 Sheets—Sheet 5.

G. SAUTTER, J. M. L. SAVATIER & C. E. DE LAGABBE
CONTROL SYSTEM FOR ELECTRIC MOTORS.

No. 553,819. Patented Jan. 28, 1896.

Attest:
Samuel W. Fisher
O. L. Crl.

Inventors:
Gaston Sautter, J. M. L. Savatier
and C. E. de Lagabbe,
by Pollok & Mauro
their attorneys.

United States Patent Office.

GASTON SAUTTER, OF PARIS, AND JOSEPH MARIE LUCIEN SAVATIER AND CHARLES EDMOND DE LAGABBE, OF LA SEYNE, ASSIGNORS TO SAUTTER, HARLÉ & CO., OF PARIS, FRANCE.

CONTROL SYSTEM FOR ELECTRIC MOTORS.

SPECIFICATION forming part of Letters Patent No. 553,819, dated January 28, 1896.

Application filed September 21, 1893. Serial No. 486,146. (No model.) Patented in France October 20, 1892, No. 225,049, and in England July 27, 1893, No. 14,486.

*To all whom it may concern:*

Be it known that we, GASTON SAUTTER, residing at Paris, and JOSEPH MARIE LUCIEN SAVATIER and CHARLES EDMOND DE LAGABBE, residing at La Seyne, near Toulon, in the Republic of France, citizens of France, have invented certain new and useful Improvements in Control Systems for Electromotors, (which have been patented in France October 20, 1892, No. 225,049, and in Great Britain July 27, 1893, No. 14,486;) and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to means for electrically maneuvering armored turrets, guns, and ammunition on board ships and in fortified places, which means are also suitable for other purposes.

Up to the present time armored turrets have usually been worked by steam or water under pressure. The objections to the use of these agents for transmitting power are numerous. Leakages are frequent and serious. The escaping steam or water damages the objects it meets with, rusting the mechanism and flooding the compartments. These leaks involve difficult and lengthy repairs. Frost often renders the use of water under pressure impossible. The difficulties of installation become considerable when it is necessary to unite a movable part of the passages with a fixed part, the joints being always a weak spot. The obstruction and weight of the water and steam passages are a great embarrassment in modern ships, already too greatly encumbered. Damages in an engagement become more probable and they are almost impossible to repair in good time. They cause the whole mechanism to be useless—even the portions which have not been touched. Other objections exist; but reference thereto is unnecessary. The use of electricity does away with these objections. Leakages in the connections are of small importance and easy to prevent. The degree of temperature no longer has any dangerous effect. The obstruction and weight of the motors is greatly reduced. The laying of the circuits presents no serious difficulties. Energy may be transmitted from a fixed to a movable part by means of a simple flexible cable. Damages are less frequent. They may be localized by means of circuit-breakers consisting of fusible wires or disconnecting mechanism without disturbing the intact portion, which continues to work. In short, they may be repaired rapidly, even at the time of action. Working by hand may immediately take the place of working by electricity, it being sufficient to cut off the motor-current and the exciting-current to be able to move the mechanism without experiencing any resistance on the part of the armature, the weight of which may form a fly to regulate the action of the handles. These advantageous qualities of electrical transmission of power, which are common to all installations of this nature, would be sufficient by themselves to justify adoption of this agent for the control of guns. We have, however, succeeded in obtaining still more perfect results with the electric motor by giving it mechanical qualities which neither water under pressure nor steam possess, accomplishing this by means of novel arrangements and combinations of maneuvering apparatus which constitute this invention.

The present invention comprises arrangements of electrical apparatus and circuits, whereby an electromotor may be controlled and maneuvered from a distance, rotated in either direction at different speeds, for short or long movements, and arrested instantaneously at will by the operator, all with great precision, promptness, and facility. Whether the said system be applied to maneuvering guns and turrets on shipboard, for which it is specially adapted, or to other purposes, is immaterial, the novel parts of the invention residing in the means and devices for controlling an electromotor. The motor employed is separately excited and preferably of a type which starts at full charge.

In applying the invention to vessels special precautions must be observed. The principal mechanism, generating-dynamos, &c., may be placed far from the control-station and suitably sheltered. The control-station, which is less liable to injury by reason of its small size, is connected with the maneuvering-chamber by circuit connections of small dimensions, the principal circuit for feeding the motors being completely protected.

The generating-dynamos are of constant voltage. They supply both the exciting-circuit of the electromotor and also the working current, being for the latter circuit preferably coupled in pairs in series.

The control apparatus, the description of which is given below, constitues the principal part of the invention. It allows the following operations to be effected: causing the current to pass or preventing it from passing in the armatures of the motors; short-circuiting the motors; causing the current to pass through variable resistances; repeating these operations for either direction of motion; giving the electric motor small displacements by making the operations of short-circuiting and putting in motion follow each other at short intervals.

The control apparatus is shown in the drawings annexed.

Figure 8:
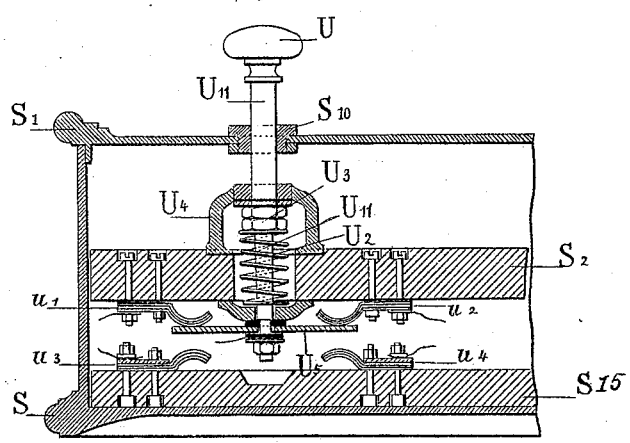
Figure 9:
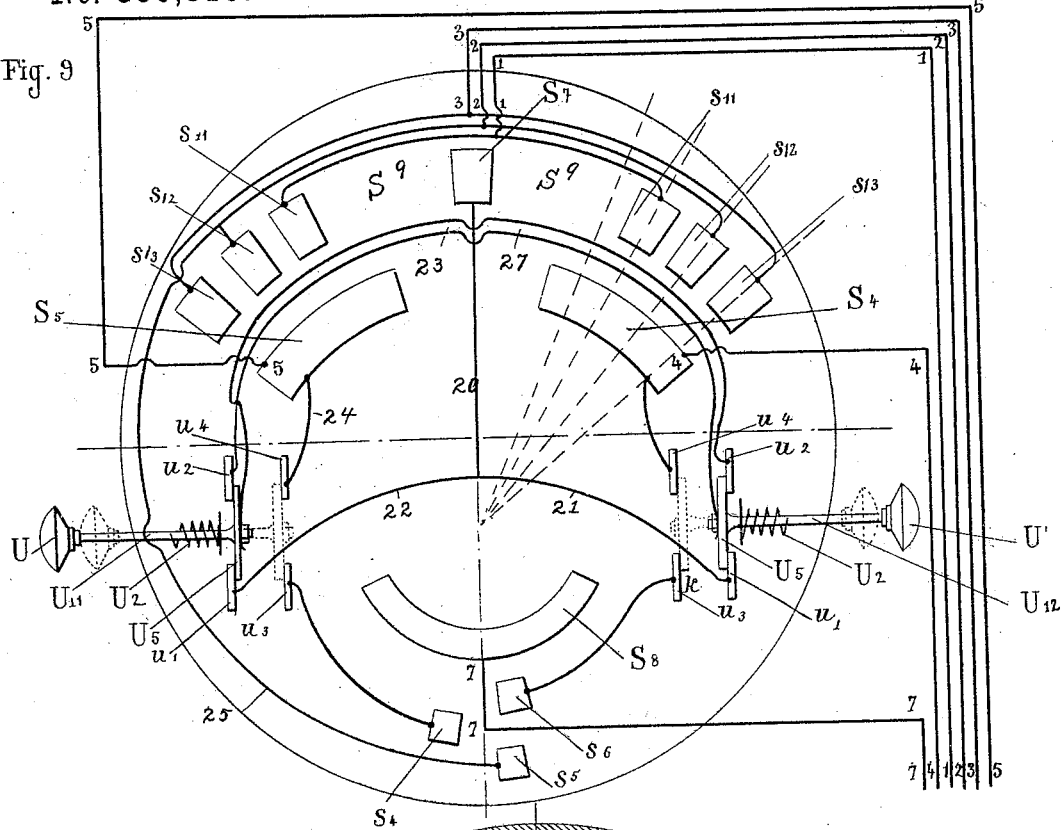
Figure 10:
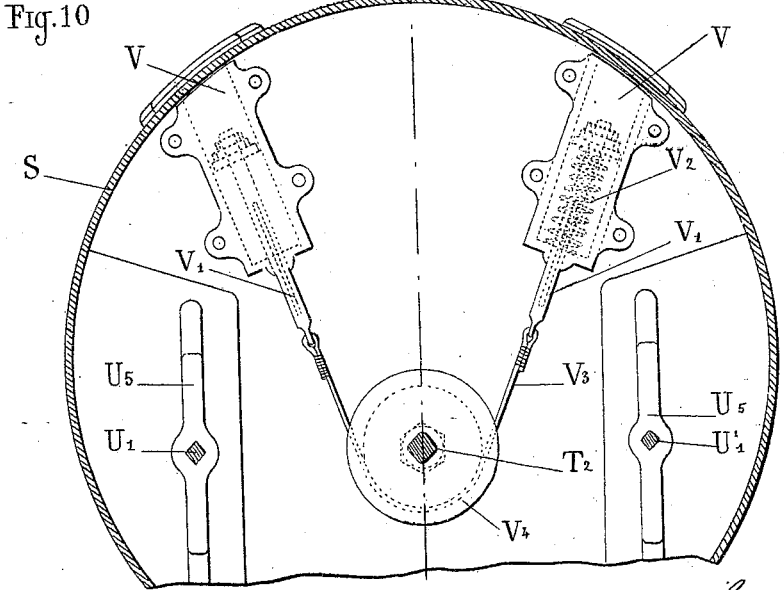

Figure 1 is a diagrammatic view of the connections of the apparatus used for electrically working turrets. Figs. 2, 3, 4, and 5 show the two-arm circuit-closer or switching apparatus. Fig. 2 is a side elevation partly in vertical section. Fig. 3 is a plan, Fig. 4 is a front view, and Fig. 5 a longitudinal section, on the line I I, Fig. 2. Figs. 6, 7, 8, 9, and 10 show the apparatus for controlling from a distance. Fig. 6 is a plan with the cover removed. Fig. 7 is a transverse section through the axis on the line II II, Fig. 6. Fig. 8 is a transverse section on the line III III, Fig. 6. Fig. 9 is a diagrammatic view showing the inner connections of the control apparatus. Fig. 10 is a horizontal section on the line IV IV, Fig. 7, showing the method of returning the handle to zero.

Z, Fig. 1, represents a motor of approved type. Current to the armature is supplied through mains 8 9, with which are associated various apparatus, hereinafter described, for reversing the current, interrupting it, and varying its speed. The exciting-current through the field-coils of the motor is supplied by the circuits 17 18. These circuits may contain fuses $x\,x$. A derived circuit from the exciting-circuit 17 18, of which one main conductor 7 leads from conductor 17, conveys current through the control or switching mechanism at the top of Fig. 1, this circuit having a number of alternative return paths by parallel wires 1 2 3 4 5, all uniting in a common return-wire 6. The course of the current through these maneuvering circuits is dependent upon the position of the switching devices at the control-station, which are manipulated by the hand of the operator. In these circuits are electrically-operated switches or circuit-closers, controlling the main motor-circuit, for determining the direction and intensity of the current through the armature-coils. The positions of these circuit-closers are indicated on the diagram Fig. 1 by the letters D $d'$ $d^2$ $d^3$. The two circuit-closers D control the direction of the main current, while the circuit-closers $d'$ $d^2$ $d^3$ control the speed by eliminating successively the resistances 15 14 13. The main circuit-closers D also control a short circuit across the conductors 10 12, which lead to the motor-armature, whereby the motor when cut out is also short-circuited.

Having thus given a general idea of the apparatus comprised in the system and their relative positions and functions, we will proceed to describe the same in detail, beginning with the controlling circuit-closers, Figs. 2, 3, 4 and 5. These figures illustrate a two-arm circuit-closer (indicated at D in Fig. 1) which provide a path for the current both in going to and returning from the motor-armature. The auxiliary circuit-closers $d'$, &c., have only a single arm or switch and will not require separate description.

The switch arm or lever A is pivoted at B' in a support B, and has one end forked to carry two contact-bridges F F' in the form of bundles of conducting-plates, and also the contact-plates $E^4$ $E^5$. It carries an armature D' of an electromagnet D provided with a base $D^3$ and core $D^2$. The armature is shown in Fig. 2 in its attracted position. Normally it is retracted by a spring C, attached at its base $C^2$ to the bed-plate of the apparatus by a nut $C^4$ and washer $C^3$, and to arm A by a socket C'. Arm A also carries a conducting-rod $A^4$, insulated by a plate $A^3$. It is provided with a binding-post O, which is a terminal of the short circuit for the motor, and a carbon-block N in socket $A^5$, which block in the normal position of arm A closes the short circuit by contact with a carbon-block J. The latter is in a socket J' carried by screw-rod $J^3$, having an adjusting-nut $J^4$ and lock-nut $J^5$, whereby the pressure of spring $J^2$ on socket J' may be adjusted. A stirrup K forms a stop for arm A and also a support for socket J', the support L of the latter being insulated by a plate L' and having a chamber for spring $J^2$. M is a terminal electrically connected by a conducting-rod $L^2$ with support L.

Q is a binding-post which is connected with post O by a flexible conductor P and to which the conductor 11 of the short circuit is connected, Fig. 1.

The parts Q P O $A^4$ L $L^2$ M which form parts of the short circuit referred to above are indicated in Fig. 1. $A^7$ are screws which secure conductor $A^4$ to arm A, and $A^6$ are screws which secure stirrups E E' to the forked ends of arm A, stirrups E E' being insulated by plates A'.

The flexible contact-plates $E^4$ $E^5$ already referred to are attached respectively to lateral extension of stirrups E E' by screws $E^2$. Plate $E^4$ in the position shown closes a circuit across carbon-contacts H, while plate $E^5$ closes a similar circuit across similar contacts. Each carbon H is in a conducting-socket H', carried by a rod $H^3$, pressed upward by a spring $H^2$, and regulated by nuts $H^4 H^5$. Flexible conductors $H^6$ connect rods $H^3$ with contacts G G'. The conducting plates or brushes F F' in the stirrups E E', respectively, make contact with the terminal plates G G on one side and G' G' on the other.

The circuit for the motor (in both direct and return branches) is closed and opened by the brushes F F' making contact with terminals G' G' and separating therefrom. The auxiliary contact-plates $E^4$ $E^5$ are provided to prevent injury from sparking. When lever A is drawn down these plates come in contact with the spring-pressed carbons H, establishing a circuit before the bunched conductors F F' have touched terminals G G'. Therefore the sparking is produced at the carbons. On breaking the circuit of magnet D the reverse action occurs, the metallic contact being broken before the circuit is opened at the carbons H.

By referring to Fig. 1 it will be seen that main conductor 8 leads to one terminal G' and conductor 9 to one terminal G. When magnet D is excited the current from wire 8 continues by brushes F' across to the other terminal G', and thence by wire 10 to the armature of motor Z, returning by wire 12, which, after passing through resistance-coils 13 14 15, proceeds by wire 16 to terminals G and thence to conductor 9. When magnet D is cut out the motor-circuit is broken at two points by the movement of arm A under the influence of spring C. At the same time the short circuit around the motor is completed by contact of the carbons N J, the spark being taken entirely by the carbons. In order, however, to prevent several breaks of contact due to the vibration of spring C or of spring $J^2$, a bipolar magnet R is provided, which coming into operation the instant the short circuit is closed causes the carbons N J to be pressed more firmly together. The magnets R are, as indicated in Fig. 1, in the short circuit of motor Z. Magnet R has the two cores R', the armature $R^2$, secured by screws $R^3$, to a block $R^4$, mounted slidingly on arm A.

As indicated in Fig. 1, the system includes two switching mechanism or circuit-closers, such as just described, one on each end of the apparatus. They are reversely connected with the main motor-circuit, so that when magnet D of the right-hand circuit-closer is energized the motor will move to the right. When the magnet of the left-hand circuit-closer is energized the direction of the circuit and consequently that of the armature's rotation is reversed.

The one-arm or simple circuit-closers (indicated at $d'$ $d^2$ $d^3$, Fig. 1) require no separate description, being similar to the two-arm circuit-closer, except that they control only a single pair of contacts ($g$ $g'$ $g^2$) and are not provided with means for opening and closing a short circuit.

We will now describe the means whereby the main circuit-closers are actuated to rotate the motor in one direction or the other, and whereby, when the motor-circuit is closed, any one of the speed-controlling circuit-closers may be actuated to vary the resistance of the motor-circuit, and thus regulate the speed of the motor. This mechanism is illustrated in Figs. 6 to 10, inclusive. Its principal movable part is a handle T' pivoted on a spindle $T^2$ and having a knob T. This handle carries a switch-arm $T^4$, adapted in various positions to connect stationary contact-plates in the circuits of the several circuit-closer magnets, as hereinafter explained.

S represents a cylindrical case containing the apparatus, S' being the lid and $S^2$ an insulating-slab on which the contact-plates are mounted. In this slab is a bushing $S^6$ forming a bearing for spindle $T^2$. $S^3$ is an insulated contact-plate, having no line connection. On each side thereof, but electrically-insulated therefrom, is a curved contact-plate $S^4$ and $S^5$. The former is connected with the right-hand magnet D by conductor 4, and the latter with the left-hand magnet by conductor 5, Fig. 9.

$S^7$ represents the normal resting-contact of the switch-arm, and, for purposes hereinafter explained, is connected with contact-plates $u'$ $u'$ by conductors 20 21 22, Fig. 9. $S^8$ is the terminal of one side 7 of the circuits of the circuit-closers and with which the rear end of switch-arm $T^4$ is always in electrical contact. Obviously, therefore, a slight motion of lever T' to the right will close the circuit of the right-hand circuit-closer magnet, which, by the switching devices it controls, causes current to flow through the armature-coils of motor Z in a definite direction. A slight motion of said lever to the left closes the circuit of the left-hand circuit-closer magnet, causing the motor to revolve in the opposite direction.

On each side of the center line of the instrument are three contact-plates $S^{11}$ $S^{12}$ $S^{13}$, insulated from $S^7$ by insulating-strips $S^9$ and also insulated from each other. These contacts belong respectively to the auxiliary circuit-closers $d'$ $d^2 d^3$, being connected therewith by the conductors 1 2 3, respectively, Fig. 9.

It will be seen, Figs. 6 and 7, that switch-arm $T^4$ is prolonged so that, in addition to making contact with terminal $S^4$ or $S^5$, it will (when lever $T^2$ is turned to the proper angle) make contact also with one of the auxiliary contact-plates $S^{11}$, &c. In this case the energizing-current received at line-terminal $S^8$ divides, part of it maintaining its path through the main circuit-closer magnet D, keeping the motor Z in circuit, and part of it circulating through the coils of one of the auxiliary circuit-closer magnets. This has the effect of eliminating one (or more) of the resistances Y Y' Y² in the motor-circuit.

Switch-arm T⁴ is attached to a hub t' on spindle T², the hub being insulated from said spindle by a layer t². A spring t is provided to press the switch-arm firmly into contact with the stationary terminals. Lever T' also carries a supplementary switch-arm T⁵, which in the normal position of lever T² connects arm T⁴ with the small contact-plates s⁴ s⁵ s⁶, arm T⁵ being insulated from spring t by a layer t³ of insulating material. The circuits of which these contacts form part are utilized for giving small movements to the motor, as will be explained hereinafter. For these movements the knobs U U' are used the one for movements in one direction, the other for movements in the opposite direction. As these devices are duplicates, a description of one will suffice for both. Rods U¹¹ U¹² carrying said knobs are each mounted to slide in a bushing S¹⁰ in lid S', Fig. 8, and in a guide-piece U⁴, being normally raised by a spring U² bearing against a nut U³. Each rod carries a contact plate or bridge U⁵ normally connecting terminal plates u' u². When the knob is depressed this bridge closes a circuit across terminals u³ u⁴.

It may be well to indicate here by the aid of the diagram, Fig. 9, what occurs in this case. Assuming the main switch-arm to be in its normal position the motor Z is short-circuited and at rest. If the right-hand knob U' be depressed the circuit of magnet D will be closed by the following path: conductor 7, terminal S⁸, switch-arms T⁴ T⁵, terminal s⁶, terminal u³, bridge U⁵, terminal u⁴, terminal S⁴, which, as we have seen, is the terminal of magnet D. At the same time a parallel circuit is closed by contact s⁵ and conductor 25 to the conductor 2 of the intermediate speed-regulating circuit-closer d², so that the motor rotates in the desired direction at a moderate speed. As soon as the knob is released the circuit of magnet D is broken, and the motor comes instantly to rest. The other knob is used in the same way for small movements in the opposite direction. Obviously these controlling devices cannot be used except when lever T is in its normal or resting position, and therefore it is desirable to insure its return to that position as soon as released by the hand of the operator. To that end spindle T² has a pulley V⁴, around which passes a cord V³ whose opposite ends are attached to plungers V', actuated each by a spring V² contained in a box V. The parallel conductors 1 2 3 4 5 of the several magnets of the circuit-closers all connect with a common return conductor 6, as indicated in Fig. 1, on which the paths of these circuits can be readily traced. The path of the main current (assuming the right-hand circuit-closer to be actuated) is from main wire 8, across contacts G' of said circuit-closer to wire 10, thence to the armature of motor Z, returning by wire 12 to its juncture with wire 16, thence through the resistance-coils in conductor 16 to contacts G and main 9. Thus the motor rotates at the lowest speed; but if lever T' be turned far enough to bring magnet d' of the first one-arm circuit-closer into action, it will be seen that a new path is made for the current from conductor 16 by wire 14 across contacts g, thus eliminating or rather short-circuiting resistance Y². A further motion of the switch-lever closes the circuit of magnet d², closing a path by wire 13 around the two resistances Y² Y', and a further movement closes a path by wire 12 around all the resistances.

If the lever-arm T' be moved to the left, the left-hand circuit-closer comes into action, and the current passes through the motor in the opposite direction. When the lever T' is at zero, the motor is short-circuited. The path of this circuit may be traced from conductor 12 to terminal M on the switching apparatus, Fig. 3, conducting-rod L², socket L, carbon-blocks J N, conductor A⁴, terminal post O, conductor P, and terminal Q of the right-hand circuit-closer, thence by conductor 11, passing through both the short-circuiting magnets R to post Q on the other circuit-closer D, and passing through the elements enumerated above in the reverse order to conductor 10.

In using the knobs U U' for giving small movements the motor can be quickly turned in either direction and arrested with great exactness, it being found that on releasing the knob, thereby re-establishing the short circuit, an electric break of great power is developed, instantaneously arresting the motor. At the moment of starting the motor gives its couple of maximum power, a condition very favorable for producing small displacements.

It will be observed that it is impossible, with the control apparatus constructed as described, and as illustrated in Fig. 9, to actuate at the same time the electromagnets of both the motion-giving circuit-closers. This proceeds from the fact that the circuit-changer U⁵ of each knob U U', when moved from its resting-contacts u' u², breaks the circuit which would ordinarily be closed by the depression of the other knob. As already shown, the exciting-circuit (when handle T' is in its normal position) runs from terminal S⁷ by wires 20 21 22 to the two contact-plates u', while the circuit-changer U⁵ on one side is connected to the contact-plate u² on the other, and vice versa. If, therefore, while knob U is depressed, closing the circuit of one switching-magnet, the knob U' be also depressed, the said circuit is instantly broken at u' U⁵.

If, at such time, the main handle of the control apparatus be actuated, the exciting-circuit will be broken between contact S⁷ and the circuit-maker T⁴.

Having thus particularly described our invention, what we claim as new, and desire to secure by Letters Patent, is—

1. In a control system for electromotors, the combination with the motor of two two-arm circuit-closers, each controlling the main circuit and adapted each to send current through the armature in a certain direction, a series of speed-controlling circuit-closers each controlling resistances in the main circuit, an electromagnet for each of said circuit-closers, an exciting-circuit including the several magnets in parallel or derived branches, and circuit-changing or switch mechanism for closing at will the circuit through any of said magnets, substantially as described.

2. The combination with the electromotor and the supply-circuit thereof, of two circuit-closers controlling contacts in said circuit for sending current through the same in either direction, auxiliary speed-controlling circuit-closers controlling resistances in said circuit, an exciting-circuit having branches each including the actuating-magnet of one of said circuit-closers and switching mechanism comprising a movable switch-arm and stationary terminals in said exciting-circuit arranged on opposite sides of the normal position of said switch-arm, as specified, whereby motion of the said arm closes the circuit of one of the main circuit-closers, according to the direction in which the switch-arm is moved, and its further motion, without breaking the circuit last named successively closes the circuits of the speed-changing circuit-closers, substantially as described.

3. In a control system for electromotors, the combination with the motor and its supply-circuit, of two circuit-controllers actuated each by an electromagnet, for controlling the direction of the current in said supply-circuit, auxiliary circuit-closers also actuated by electro-magnets for controlling the speed of said motor, a control-circuit including in branches thereof the magnets of said circuit-closers and switching devices in said control-circuit, substantially as described.

4. In a control system for electromotors, the combination with the motor, its main supply-circuit, and a bridge extending across the main conductors of the supply-circuit of a circuit-closer carrying a circuit-maker for the main circuit, and a circuit-maker for the bridge, operative respectively in different positions of the circuit-closer, and means such as a push button or knob controlling contacts in said bridge, to open and close at will the short circuit around the motor for giving the latter short movements, substantially as described.

5. In a control system for electromotors, the combination with the motor, its main supply-circuit, and a bridge or short circuit, of a switch-arm carrying a circuit-maker, for each of said circuits, operative respectively in different positions of said arm, an actuating-magnet adapted when excited to move the arm into position to close the main supply-circuit, a spring for retracting said arm, and a magnet in the said bridge or short circuit supplementing the action of said spring, substantially as described.

6. In a control system for electromotors, the combination with the motor, its main supply-circuit and a short circuit or bridge, of a circuit-closing apparatus comprising a pivoted arm, contact-plates carried thereby for closing or opening both the direct and return conductors of the supply-circuit, auxiliary carbon-contacts also actuated by said arm for receiving the sparks when the circuit is opened and closed, a circuit-closer for said short circuit, also carried by said arm, a magnet for moving said arm to close the main circuit, a spring acting in opposition to said magnet, and a magnet in said short circuit supplementing the action of said spring for maintaining the short circuit, substantially as described.

7. In a control system for electromotors, the combination with the motor, and its supply-circuit, of two circuit-closers for controlling the current in said circuit and its direction, an exciting-circuit including the magnets of said circuit-closers each in a separate branch, a short circuit around the motor, contacts therein controlled by said circuit-closers for breaking the short-circuit when the magnet of either circuit-closer is energized, and switch mechanism for said exciting-circuit comprising a main switch-arm adapted to close the circuit of either of said circuit-closer magnets, according to its position, and auxiliary switches or push-knobs, one for each circuit-closer, the connections of said exciting-circuit being so arranged that if both knobs be simultaneously depressed the said circuit will be broken, substantially as described.

In testimony whereof we affix our signatures in the presence of two witnesses.

GASTON SAUTTER.
JOSEPH MARIE LUCIEN SAVATIER.
CHARLES EDMOND DE LAGABBE.

Witnesses to Gaston Sautter:
  ROBT. M. HOOPER,
  G. DE MESTRAL.

Witnesses to Joseph Marie Lucien Savatier and Charles Edmond de Lagabbe:
  H. LEBY,
  N. LAGANE.